(12) United States Patent
Jonsson et al.

(10) Patent No.: US 7,934,891 B2
(45) Date of Patent: *May 3, 2011

(54) CUTTING INSERT FOR TURNING WITH A RECESS INTENDED TO FACILITATE FLOW OF A COOLING JET

(75) Inventors: Mats Jonsson, Hedemora (SE); Thomas Eriksson, Falun (SE)

(73) Assignee: Seco Tools AB, Fagersta (SE)

( * ) Notice: Subject to any disclaimer, the term of this patent is extended or adjusted under 35 U.S.C. 154(b) by 94 days.

This patent is subject to a terminal disclaimer.

(21) Appl. No.: 11/917,005

(22) PCT Filed: Jun. 29, 2006

(86) PCT No.: PCT/SE2006/000799
§ 371 (c)(1),
(2), (4) Date: Dec. 10, 2007

(87) PCT Pub. No.: WO2007/004951
PCT Pub. Date: Jan. 11, 2007

(65) Prior Publication Data
US 2008/0193231 A1 Aug. 14, 2008

(30) Foreign Application Priority Data
Jul. 5, 2005 (SE) .................................. 0501575-5
Jul. 5, 2005 (SE) .................................. 0501576-3

(51) Int. Cl.
*B23P 15/28* (2006.01)
(52) U.S. Cl. .............................. 407/114; 407/2; 407/115
(58) Field of Classification Search .................. 407/2, 6, 407/11, 100, 101, 114, 115, 116
See application file for complete search history.

(56) References Cited

U.S. PATENT DOCUMENTS

| 3,781,956 | A | * | 1/1974 | Jones et al. | 407/113 |
| 3,885,281 | A | * | 5/1975 | Stambler | 407/114 |
| 4,288,179 | A | * | 9/1981 | Kruger et al. | 407/114 |
| 4,934,879 | A | * | 6/1990 | van Barneveld | 407/66 |
| 5,032,049 | A | * | 7/1991 | Hessman et al. | 407/113 |
| 5,044,839 | A | * | 9/1991 | Takahashi | 407/114 |
| 5,044,840 | A | * | 9/1991 | Fouquer et al. | 407/114 |

(Continued)

FOREIGN PATENT DOCUMENTS
DE 29804043 U1 6/1998
(Continued)

OTHER PUBLICATIONS
English Translation of JP 09174309.*
(Continued)

*Primary Examiner* — Jason Daniel Prone
*Assistant Examiner* — Jennifer Swinney
(74) *Attorney, Agent, or Firm* — WRB-IP LLP

(57) ABSTRACT

A cutting insert for turning includes a polygonal body of a hard, wear-resistant material, which has an upper surface and a lower surface, and a plurality of edge surfaces uniting the surfaces. At least one rounded cutting corner, provided with a nose-cutting edge, is formed at a nose portion at the area of the intersection area of two edge surfaces. The cutting corner defines a bisector. At least one recess is arranged in a support surface of the upper surface at a distance from the nose-cutting edge. The recess has a general extension toward the nose portion. Each recess is elongate and has successively increasing depth toward the nose portion.

17 Claims, 7 Drawing Sheets

U.S. PATENT DOCUMENTS

| | | | |
|---|---|---|---|
| 5,067,858 A * | 11/1991 | Cook | 407/114 |
| 5,476,346 A * | 12/1995 | Lundstrom | 407/114 |
| 5,577,867 A * | 11/1996 | Paya | 407/114 |
| 5,634,745 A * | 6/1997 | Wiman et al. | 407/113 |
| 5,702,210 A * | 12/1997 | Boianjiu | 407/100 |
| 5,901,623 A | 5/1999 | Hong | |
| 5,947,651 A | 9/1999 | Murakami et al. | |
| 6,045,300 A * | 4/2000 | Antoun | 407/11 |
| 6,152,658 A * | 11/2000 | Satran et al. | 407/103 |
| 6,164,879 A * | 12/2000 | Krenzer | 408/224 |
| 6,241,430 B1 * | 6/2001 | Norstrom | 407/114 |
| 6,447,218 B1 * | 9/2002 | Lagerberg | 407/114 |
| 6,540,447 B2 * | 4/2003 | Nagata et al. | 407/35 |
| 7,182,555 B2 * | 2/2007 | Kitagawa et al. | 407/113 |
| 7,621,700 B2 * | 11/2009 | Jonsson et al. | 407/114 |
| 2004/0240949 A1 | 12/2004 | Pachao-Morbitzer et al. | |

FOREIGN PATENT DOCUMENTS

| | | | |
|---|---|---|---|
| JP | 09174309 A | * | 7/1997 |
| JP | 2001287134 A | * | 10/2007 |

OTHER PUBLICATIONS

English Translation of JP 09174309 A, Jul. 1997.*

* cited by examiner

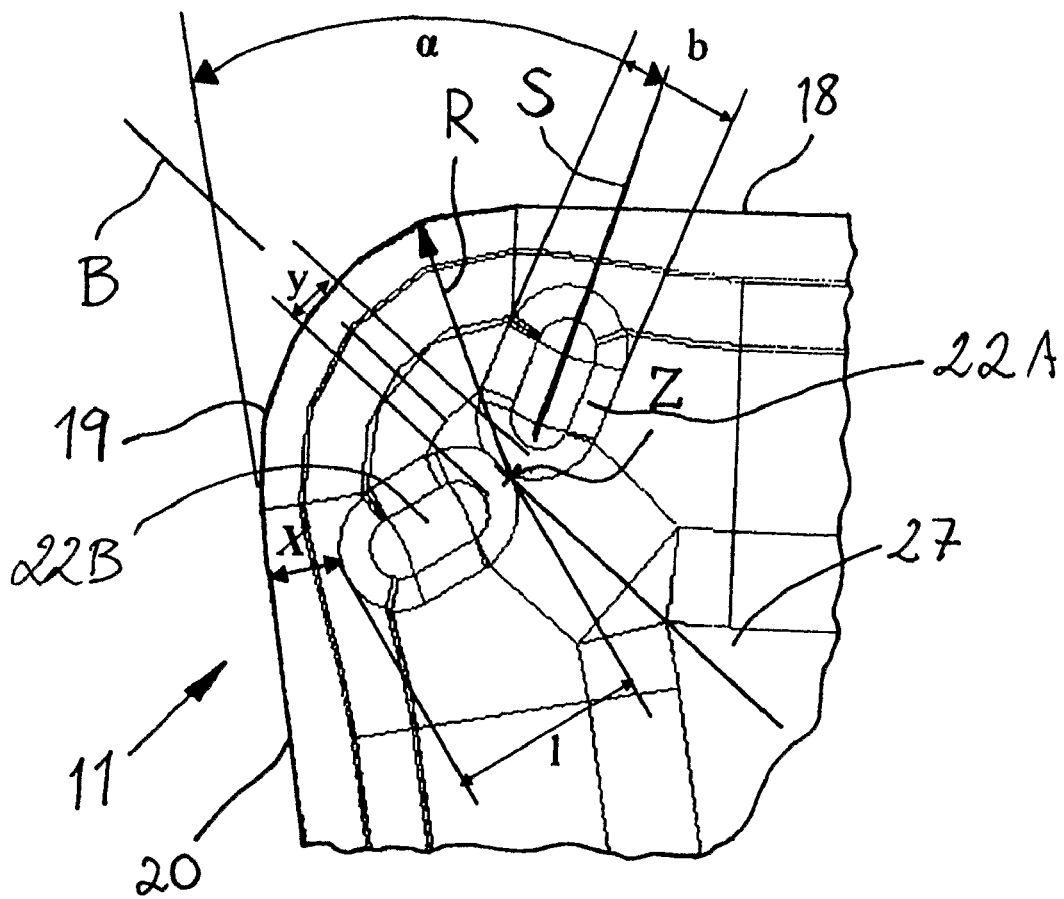
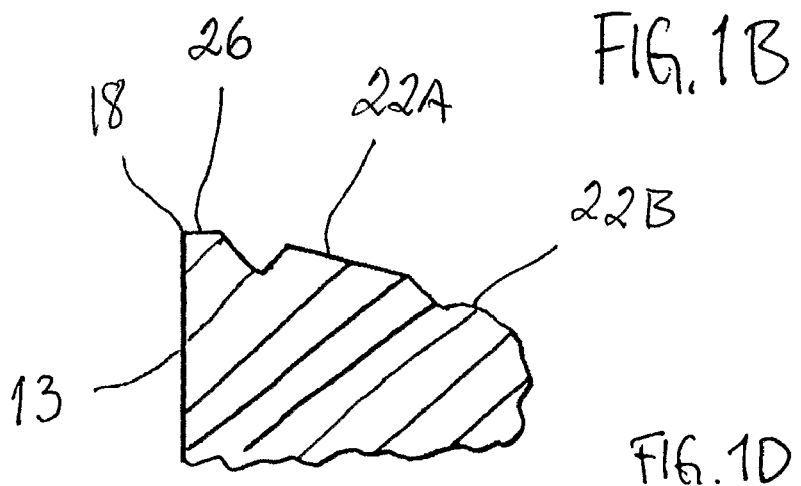
FIG. 1B
FIG. 1D

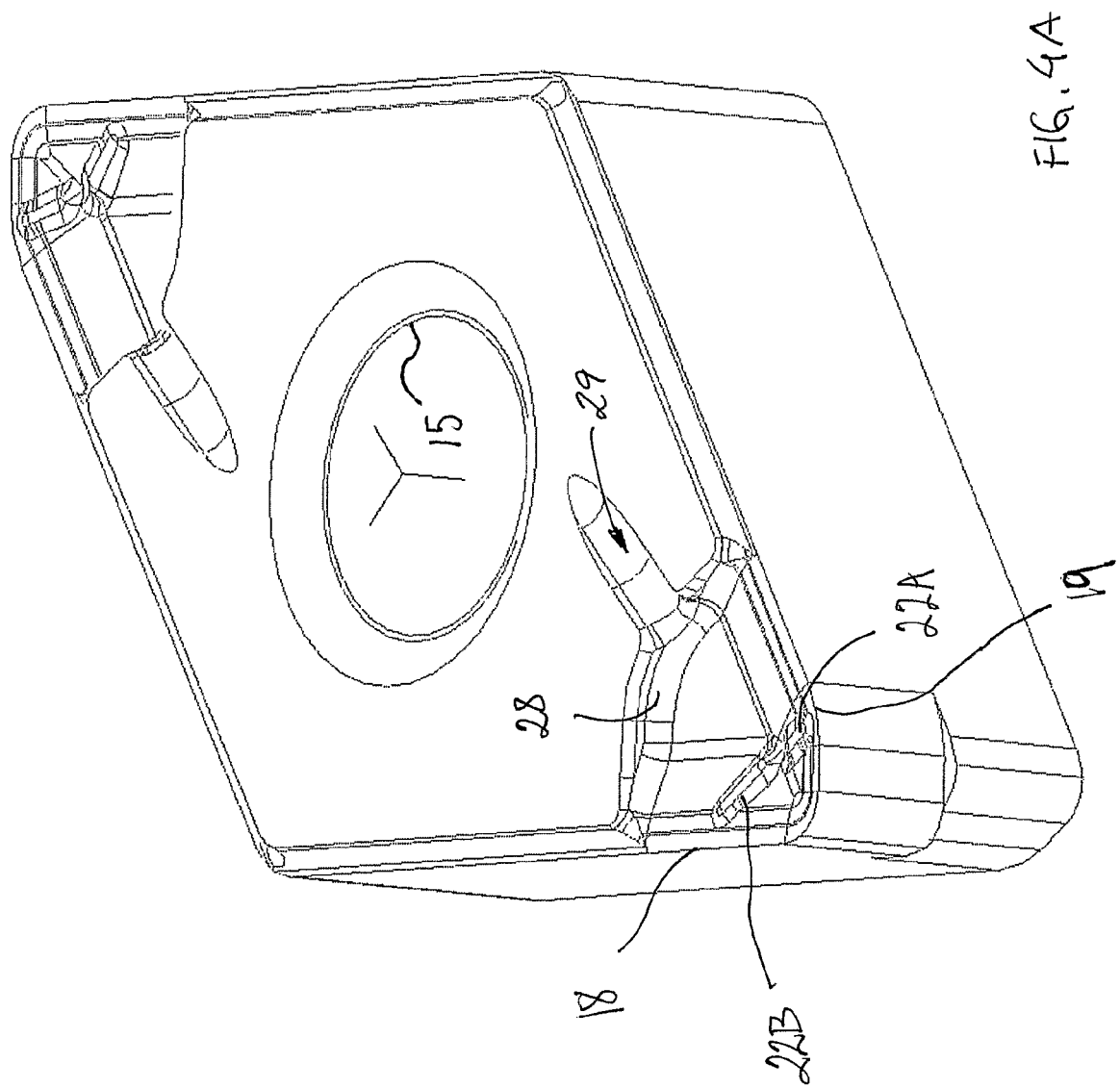

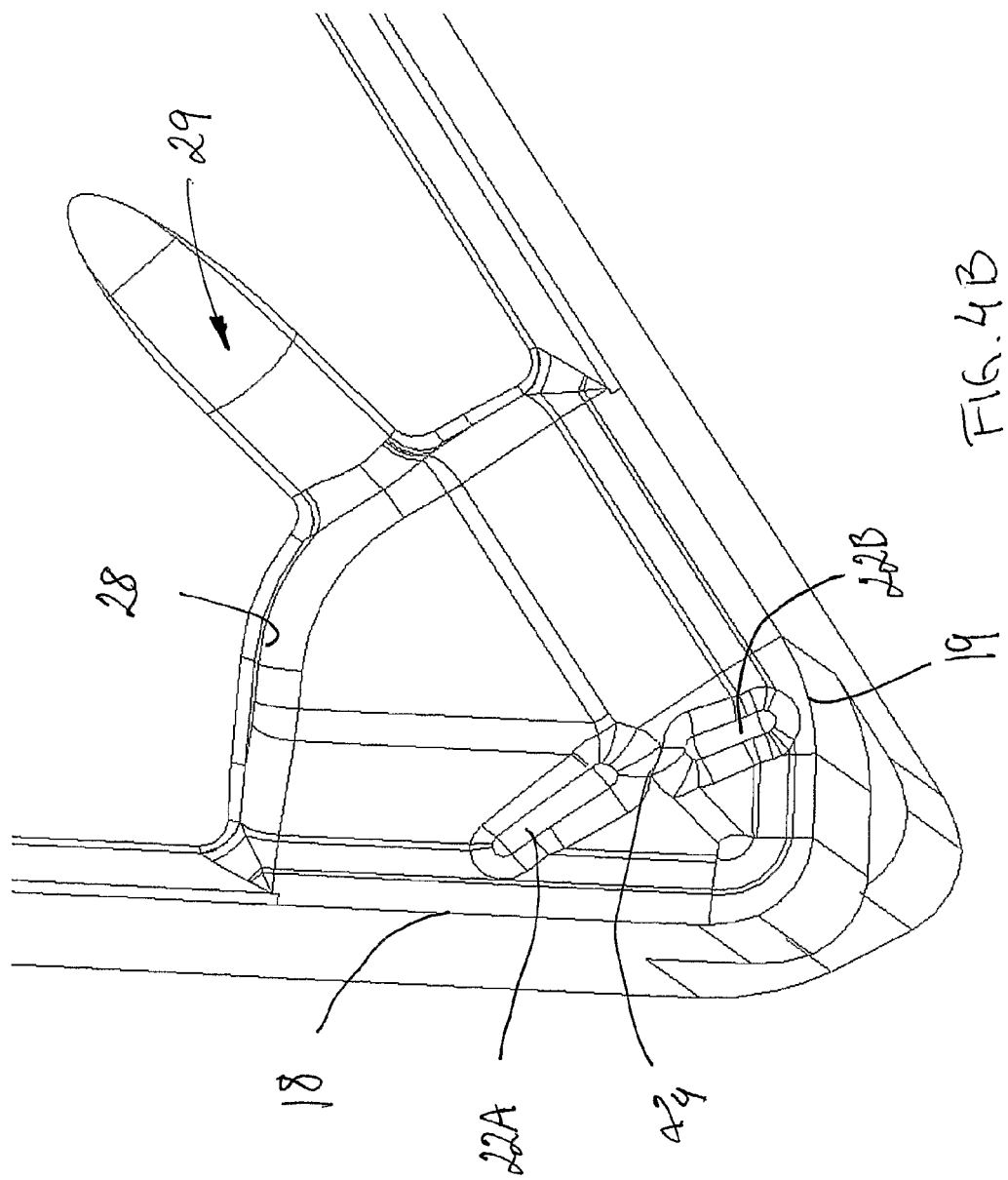

CUTTING INSERT FOR TURNING WITH A RECESS INTENDED TO FACILITATE FLOW OF A COOLING JET

BACKGROUND AND SUMMARY

The present invention relates to a cutting insert for turning.

Many of the cutting inserts found today have some form of projection near the nose-cutting edge in order to form, lead, and/or angle the chip flow. Because of said design, high pressures have to be used to enable to lift formed chips by means of a high-pressure jet. This entails higher costs because of expensive equipment and expensive operation. Furthermore, known cutting inserts entail high cutting forces. A known cutting insert has recesses, preferably near the cutting edge or even breaking through the cutting edge. The latter geometry cannot be used in practice in dry machining, since the edge will be weakened.

It is desirable to provide a cutting insert, the geometry of which is especially adapted to both dry machining and machining in combination with high-pressure cooling.

It is desirable to provide a cutting insert having improved service life and improved machining results.

It is desirable to provide a cutting insert that allows flat angles what relates to the cooling jet.

It is desirable to provide a cutting insert that gives low cutting forces.

It is desirable to provide a cutting insert that gives controlled chip forming.

BRIEF DESCRIPTION OF THE FIGURES

FIGS. 1A and 1B each shows a cutting corner in an embodiment of a cutting insert according to the present invention in plan view.

FIG. 1D shows a schematic cross section through the cutting corner along the line S in FIG. 1C.

FIG. 4A shows an additional alternative embodiment of a cutting insert according to the present invention in perspective view.

FIG. 4B shows a cutting corner of the cutting insert in FIG. 4A from above.

DETAILED DESCRIPTION

Figure 1A:
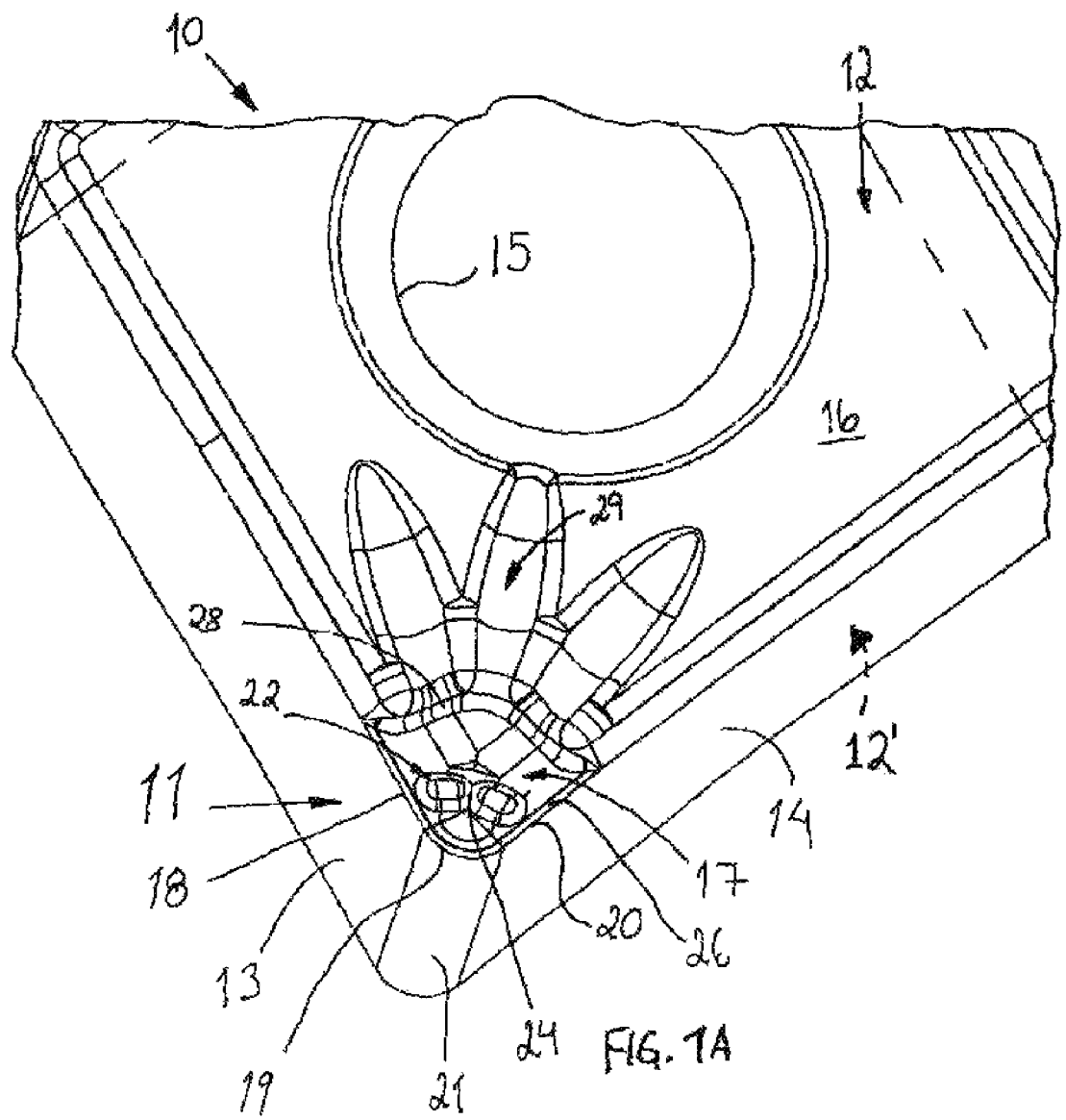
Figure 1C:
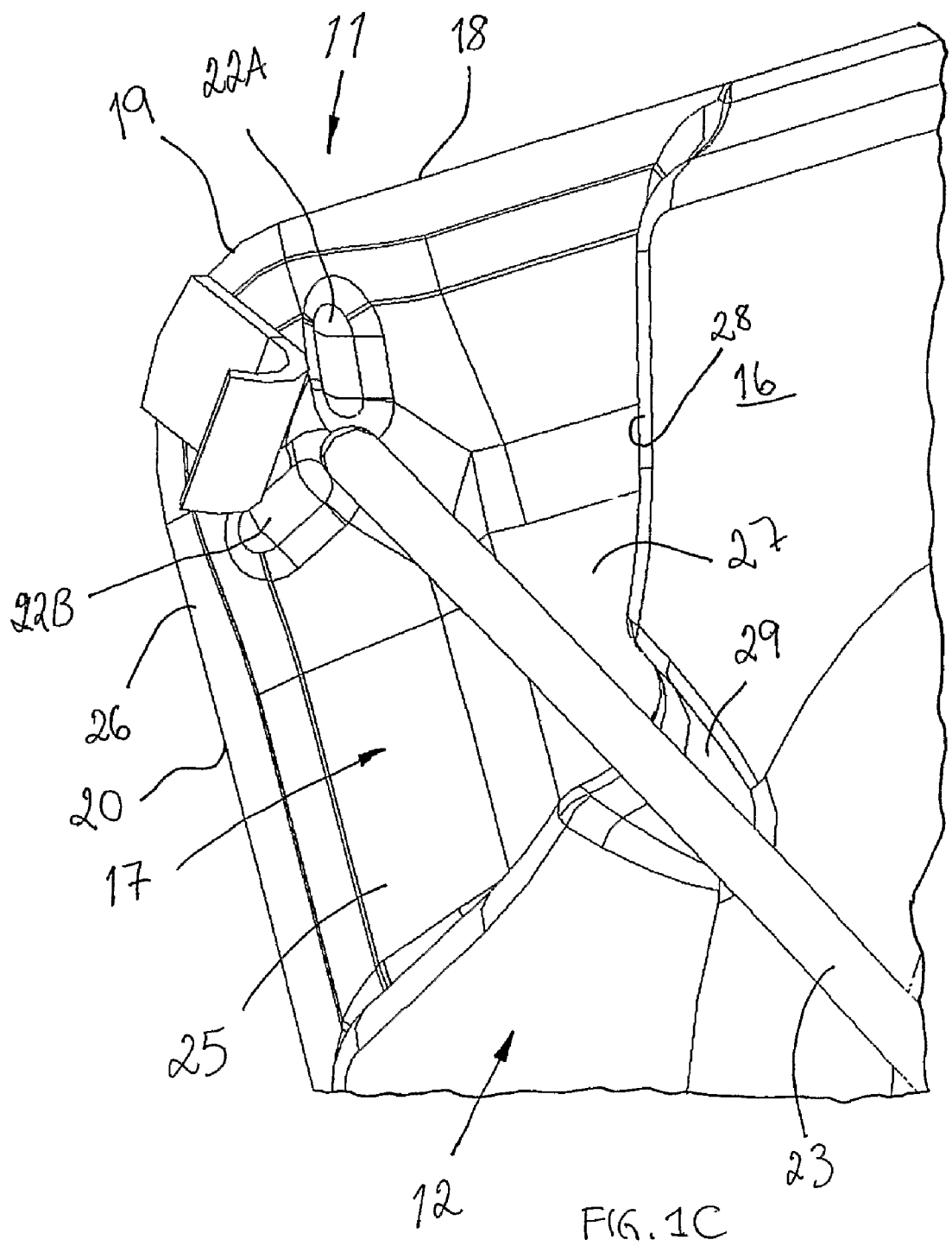
FIG. 1C shows the cutting corner in perspective view during chip breaking with the assistance of a high-pressure jet.

FIGS. 1A, 1B and 1C show a cutting corner 11 in an embodiment of a cutting insert 10 according to the present invention. The cutting insert 10 has a polygonal basic shape and may be double-sided. The cutting insert 10 is made from a hard, wear-resistant material, preferably cemented carbide, but may alternatively be of ceramics or cubic boron nitride (CBN). The most common hard material in cemented carbide is wolfram carbide, WC, and a binder metal. Alternative carbides may be of the metals titanium (TiC), tantalum (TaC) and niobium (NbC). The most common binder metal is cobalt (Co), but also nickel (Ni) is found. The cemented carbide is a powder mixture built up by carbide particles having grain sizes of 0.5-10 µm and a binder metal. The percentage by volume of the binder metal is 5-40% and the percentage by volume of the carbides is 95-60%. The cutting insert 10 is preferably coated with a layer of, e.g., $Al_2O_3$, TiN and/or TiCN.

The cutting insert 10 is developed to be used foremost in turning of metallic workpieces. The cutting insert has an upper surface 12 and a lower surface 12', shown in phantom in FIG. 1, provided in separate, essentially parallel planes, and a plurality of edge surfaces 13, 14 uniting said surfaces. The edge surfaces 13, 14 meet in rounded portions 21. The shown cutting insert 10 has a rhombic basic shape and comprises a central fastening hole 15. The cutting insert may have two acute-angled cutting corners 11 on each of the upper and lower surface. In the shown embodiment example, said tip angle is 80° but may alternatively be 55° or 60°. Cutting inserts having perpendicular and other corners are also comprised in the present invention.

The upper side 12 has an essentially planar support surface 16, formed to abut against a base surface in a pocket of a holder, not shown. The limiting lines of the support surface 16 essentially follow the basic shape of the cutting insert. The support surface 16 may surround the fastening hole 15. In the embodiment illustrated, the two support surfaces 16 are essentially plane-parallel, the same extending substantially perpendicularly to a centre axis of the hole 15.

Each cutting corner 11 comprises a portion 17 countersunk in relation to the surface 16. In this case, the portion 17 is a sintered-in chip-former or chip breaker. The intersecting line between the countersunk portion 17 and the edge surfaces 13 and 14 forms cutting edges, i.e., a first cutting edge 18, a nose-cutting edge 19 and a second cutting edge 20. The nose-cutting edge 19 is a substantially partly circular cutting edge, the radius of which is designated R and the radius centre of which is designated Z. The cutting edges 18-20 may be situated in a common plane.

At least one chip-breaker arrangement 22 may be provided in both the lower and upper surface 12, on one hand for lifting the chip during the turning and on the other hand so that both sides of the cutting insert should be possible to be used in an economical way. In the preferred embodiment example, the upper and lower surfaces are identical but mirror-inverted so that when the cutting insert is indexed with the lower surface upward for turning, it has a geometry that is identical to the upper surface 12. The cutting edges 18 and 20 of the cutting corner 11 enclose an angle, the centre of which defines a bisector B. In this case, the chip-breaker arrangement 22 is composed of two chip-breaker segments 22A, 22B, which have the purpose of lifting the chip and thereby allowing a high-pressure cooling jet 23 to come under the chip and closer to the cutting zone in order to, in this way, cool the cutting insert more efficiently and increase the service life of the cutting insert. The segments 22A, 22B are formed in such a way that an opening 24 is present between them, and thereby the possibility of directing the high-pressure jet between them is given and hence lift the chip further. Here, by "opening", reference is made to a generally countersunk portion between two chip-breaker segments provided next to each other. The segments 22A, 22B may connect somewhat to each other as is seen in the figures and are, in this case, arranged symmetrically in relation to the bisector B.

With reference foremost to FIG. 1B, the designs and positions of the segments 22A, 22B are described hereinafter. In this case, each segment is elongate and has rounded ends. The size of the segment is determined by the formula l×b×h, where, for instance, the length l=R×0.75 (R=the corner radius), the width b=¼ and the height h=0.15-0.5 mm. The radius centre Z may be situated in the opening 24. The highest point of the segment should not be arranged more than 0.25 mm above the associated cutting edge 18, 20, but may also be arranged under the cutting edges or the planes thereof. The opening 24 between the segments 22A, 22B is determined by the formula: y=b/3, where y always is at least 0.25 mm. The position of the segment 22A, 22B in relation to the opposite cutting edge 18, 20 is chosen so that the longitudinal axis S of the segment forms an angle α with the opposite cutting edge. The angle α that the segment forms with the opposite cutting edge 18, 20 may be within the interval of 10-50° and preferably within the interval of 20-40° and preferably around 32°. In the case the segments are arranged asymmetrically in relation to the bisector, the two segments 22A, 22B may be placed at different angles, see the description below in respect of FIGS. 4A and 4B. Each segment 22A, 22B is placed X mm from the associated cutting edge, where X=R×Q. The factor Q of a conventional cutting insert is within the interval of 0.3-0.5, while the factor Q of a wiper insert is within the interval of 0.4-0.8.

The countersunk portion 17 comprises a chip surface 25 sloping downward inward from the cutting edges 18-20. Frequently, a reinforcement bevel 26 is provided in direct connection to the cutting edge 18-20. Each segment 22A, 22B protrudes from said chip surface 25. Thus, each segment 22A, 22B has a similar inclination as the chip surface 25, obliquely inward downward toward the bisector B, as is seen from the schematic cross section in FIG. 1D.

Furthermore, the countersunk portion 17 comprises a bottom surface 27 provided essentially to form a space for the jet 23. Therefore, the countersunk portion 17 is provided with a wall 28 running upward toward the centre of the cutting insert. The wall 28 is displaced toward the centre of the cutting insert from the segments 22A, 22B by a distance that is at least equally large as the length l of the segment, preferably at least twice as large as the length l. The latter may also be described as the extension of the bottom surface 27 from the segments toward the centre of the cutting insert being at least equally large as the length l of the segment, preferably at least twice as large as the length l of the segment. The bottom surface 27 is essentially arranged lower, i.e., arranged closer to the opposite lower surface, than the segments and the wall.

In combination with or entirely independently of the chip-lifting segments 22A, 22B mentioned above, moreover, the angle of the jet may be further decreased in order to increase the accessibility by forming one or more recesses 29 in the support surface of the cutting insert. In FIG. 1C, one recess is shown for the sake of clarity while in FIG. 1A, three recesses are shown. All recesses have successively increasing depth and preferably also increasing width toward the nose portion 21. In the case shown in FIG. 1A, three elongate recesses 29 have been arranged so that the longitudinal axis of each recess intersects the opening 24. Said recesses may be placed at different angles in relation to the bisector B of the cutting corner in order to, in this way, give fixed positions for the angle of the jet. These recesses 29 are arranged both in order to increase the accessibility and to facilitate for the user to set the high-pressure jet at an angle making the jet to be directed against the opening 24 between the segments 22A, 22B. The chosen angle depends on the cutting depth, feed, cutting speed as well as the material to be turned. It may be noted that the recess, in itself, is passive and thereby only constitutes a bore for a cooling jet, which emanates from a nozzle provided separately from the cutting insert.

Figure 2:
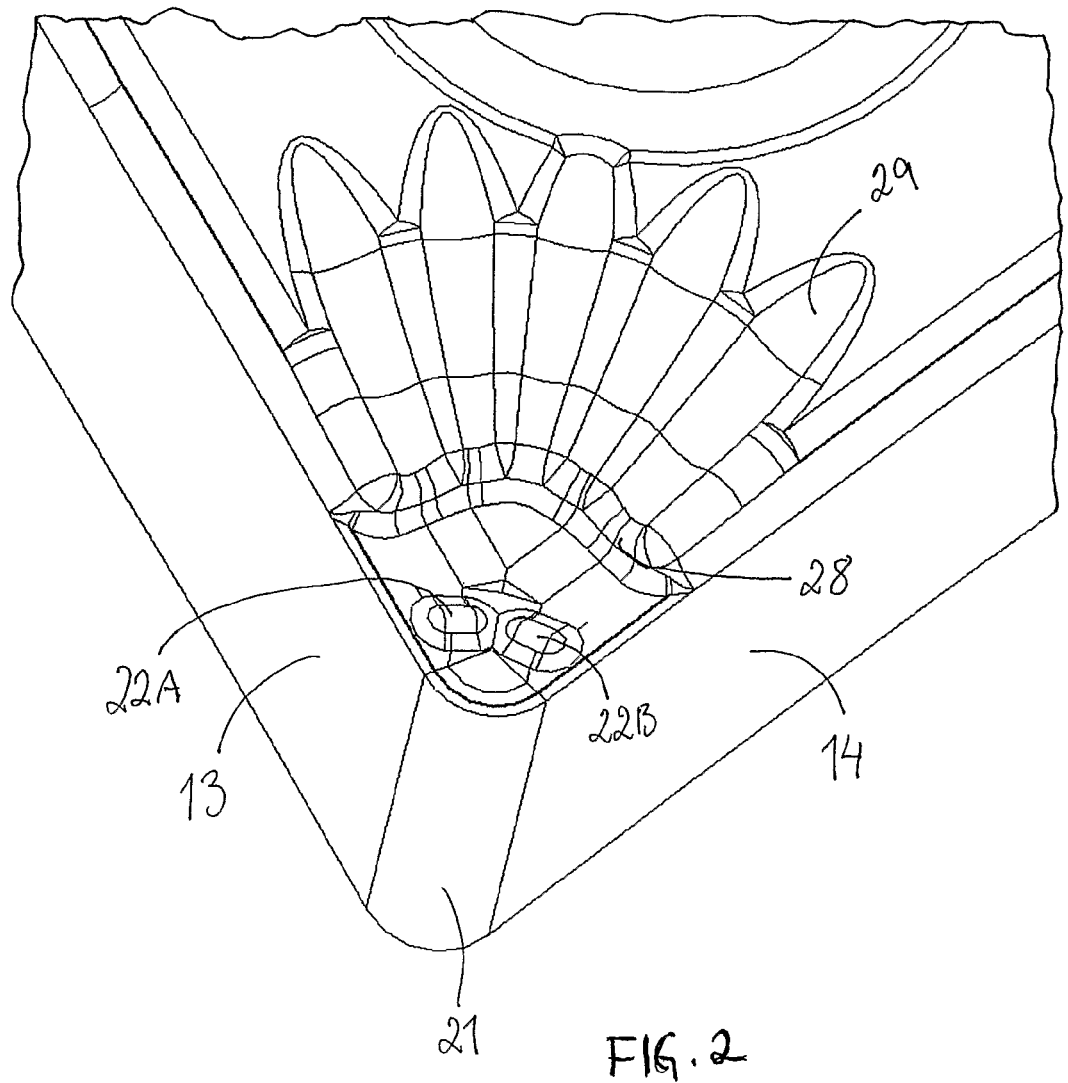
FIG. 2 shows a cutting corner in an alternative embodiment of a cutting insert according to the present invention in plan view.

FIG. 2 shows a cutting corner in an alternative embodiment of a cutting insert according to the present invention, which differs from the cutting insert 10 shown in FIGS. 1A-1C in that five recesses have been provided in a fan shape with a common focus in order to increase the number of angles to set.

Figure 3:
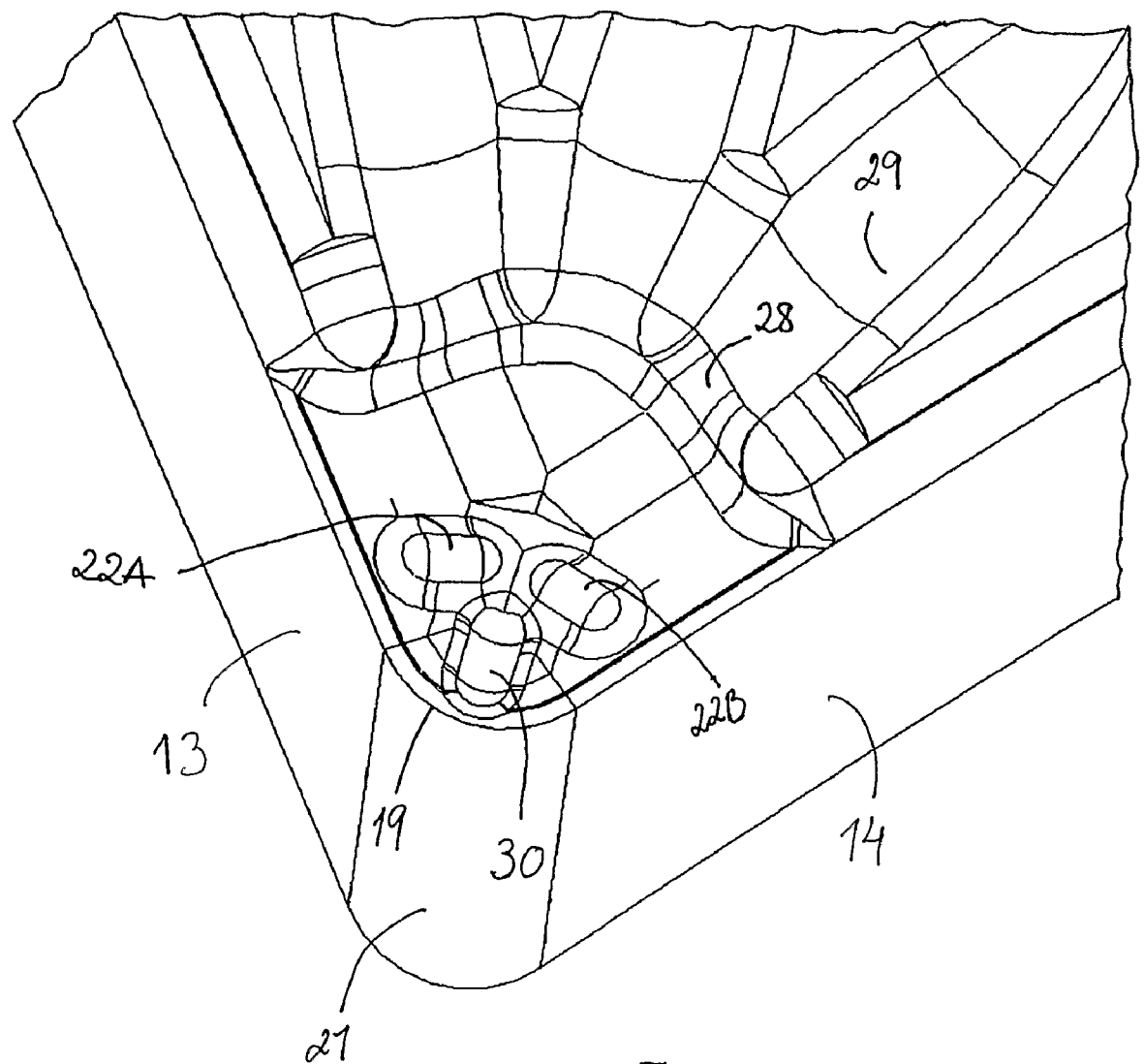
FIG. 3 shows a cutting corner in an additional alternative embodiment of a cutting insert according to the present invention in plan view.

FIG. 3 shows a cutting corner in an alternative embodiment of a cutting insert according to the present invention, which differs from the cutting inserts shown in FIGS. 1A-1C and FIG. 2 in that a flute or a concave groove 30 has been formed all the way out to the nose-cutting edge 19 or to the reinforcement bevel 26. The concave groove 30 is arranged symmetrically around the bisector B in front of the segments 22A, 22B and between the opening 24 and the rounded portion 21. Thereby, it is further ensured that the jet 23 comes as near the cutting zone as possible. In doing so, the cooling jet 23 has the possibility of coming all the way up to the cutting zone as well as lifting the chip further—and decrease the wear of the cutting insert. With a cutting insert according to this invention, flatter angles can be used without being blocked by a chip breaker. Furthermore, the jet can come closer to the cutting zone so that a lower pressure can be used in order to achieve a good chip-forming result. A lower pressure of the jet gives great advantages, foremost as for the service life the of the pump equipment but also as for the dimensioning thereof. A pump equipment for high-pressure cooling is an expensive investment. Since the cost is proportional to the working pressure thereof, not only money is saved by means of longer worn-out time of the cutting insert but also that equally high pressures do not need to be employed as in the use of a traditional chip breaker. Furthermore, from a safety and environmental point of view, as low a pressure as possible in the system is preferable. A lower pressure gives a safer handling and lower energy consumption. Furthermore, the fixed positions, i.e., the recesses 29, for the angle of the jet to the bisector B on the top side of the cutting insert assist the user to set the cutting insert for optimum machining, as well as to increase the repetition accuracy of the cutting insert, since it is visually seen if the jet is positioned correctly.

The recesses on the top side of the cutting insert are generally not intended to cool the cutting insert, but rather to avoid blocking of the jet, i.e., to enable a further reduction of the inclination of the jet.

However, the cutting insert is not formed to be used together with high-pressure cooling only, but rather the opposite, i.e., it is a cutting insert formed to operate with conventional cooling or with dry machining. By the fact that the cutting insert has a chip-breaker arrangement 22 divided in two parts near the nose-cutting edge, the portion works as an ordinary chip breaker in conventionally cooled as well as dry machining. The two segments are arranged in such a way that an opening 24 is present between them. Said opening 24 has two functions, on one hand the risk of crater wear is decreased, which otherwise is common when the chip impinges on a conventional projection in the chip surface, and on the other hand a space is provided for the high-pressure jet to impinge under the chip. With high-pressure cooling applications, here, pressures greater than 100 bar are intended.

FIGS. 4A and 4B show an alternative embodiment of a cutting insert according to the present invention that differs from the cutting inserts described above in that the cutting insert is an example of an asymmetrical wiper insert, the shape of which is described closer in SE patent No. 0201985-9, which hereby is incorporated in the description what relates to the shapes of the cutting edges and of the clearance surfaces. In this case, the segments 22A, 22B may be placed asymmetrically in relation to a bisector in the cutting corner by virtue of the feeding and cutting depth area of the cutting insert being differently great dependent on how the cutting insert is used, i.e., if it is longitudinal turning, facing or copying. In this case, the segments 22A, 22B have a completely straight basic shape, as well as a distinct gap 24 between them. The segment 22A is associated with a straight cutting edge 18 under an acute angle, while the segment 22B is associated with a curved cutting edge 19 under an angle of about 90°.

The recess 29 is provided in order to further decrease the angle of inclination of the jet without being blocked by some part of the cutting insert, and also to guide the user to set the jet at the correct angle in relation to the cutting edge.

Thus, the present invention relates to a cutting insert for turning, the geometry of which is especially adapted, among other things, to both dry machining and machining in combination with high-pressure cooling, having improved service life and improved machining result, and which allows flat angles what relates to the cooling jet.

The disclosures in Swedish patent application Nos. 0501575-5 and 0501576-3, from which this application claims priority are incorporated herein by reference.

The invention claimed is:

1. A cutting insert for turning, comprising a polygonal body of a hard, wear-resistant material, the body having an upper surface, a lower surface, and a plurality of edge surfaces uniting the upper and lower surfaces, at least one rounded cutting corner provided with a nose-cutting edge being formed at a nose portion at the area of the intersection area of two edge surfaces, the cutting corner defining a bisector, wherein at least one recess is arranged in a support surface of the upper surface at a distance from the nose-cutting edge, the recess having a general extension toward the nose portion, the recess being elongate and having successively increasing depth toward the nose portion, wherein each recess has increasing width toward the nose portion.

2. Cutting insert according to claim 1, wherein a plurality of recesses are arranged in the support surface so that a longitudinal axis of each recess intersects the same nose portion.

3. Cutting insert according to claim 2, wherein at least one chip-breaker arrangement is arranged in at least one of the lower and upper surfaces, each chip-breaker arrangement comprising two elongate chip-breaker segments, an opening being provided between the segments.

4. Cutting insert according to claim 3, wherein each segment forms an acute angle with the opposite cutting edge.

5. Cutting insert according to claim 3, wherein the segments are asymmetrically placed in relation to the bisector.

6. Cutting insert according to claim 3, wherein the recess is adapted to give room for a cooling jet directed toward the opening.

7. Cutting insert according to claim 1, wherein the number of recesses is 1 to 5.

8. Cutting insert according to claim 1, wherein at least one chip-breaker arrangement is arranged in at least one of the lower and upper surfaces, each chip-breaker arrangement comprising two elongate chip-breaker segments, an opening being provided between the segments.

9. Cutting insert according to claim 8, wherein the recess is adapted to facilitate flow of a cooling jet directed toward the opening.

10. Cutting insert according to claim 1, wherein a plurality of recesses are arranged in the support surface so that a longitudinal axis of each recess intersects the same nose portion.

11. Cutting insert according to claim 10, wherein the number of recesses is 1 to 5.

12. Cutting insert according to claim 1, wherein at least one chip-breaker arrangement is arranged in at least one of the lower and upper surfaces, each chip-breaker arrangement comprising two elongate chip-breaker segments, an opening being provided between the segments.

13. Cutting insert according to claim 12, wherein each segment forms an acute angle with the opposite cutting edge.

14. Cutting insert according to claim 12, wherein the segments are asymmetrically placed in relation to the bisector.

15. Cutting insert according to claim 1, wherein the recess is adapted to facilitate flow of a cooling jet directed toward the opening.

16. A cutting insert for turning, comprising a polygonal body of a hard, wear-resistant material, the body having an upper surface, a lower surface, and a plurality of edge surfaces uniting the upper and lower surfaces, at least one rounded cutting corner provided with a nose-cutting edge being formed at a nose portion at the area of the intersection area of two edge surfaces, the cutting corner defining a bisector, wherein at least one recess is arranged in a support surface of the upper surface at a distance from the nose-cutting edge, the recess having a general extension toward the nose portion, the recess being elongate and having successively increasing depth toward the nose portion, wherein at least one chip-breaker arrangement is arranged in at least one of the lower and upper surfaces, each chip-breaker arrangement comprising two elongate chip-breaker segments, an opening being provided between the segments, and wherein each segment forms an acute angle with the opposite cutting edge.

17. A cutting insert for turning, comprising a polygonal body of a hard, wear-resistant material, the body having an upper surface, a lower surface, and a plurality of edge surfaces uniting the upper and lower surfaces, at least one rounded cutting corner provided with a nose-cutting edge being formed at a nose portion at the area of the intersection area of two edge surfaces, the cutting corner defining a bisector, wherein at least one recess is arranged in a support surface of the upper surface at a distance from the nose-cutting edge, the recess having a general extension toward the nose portion, the recess being elongate and having successively increasing depth toward the nose portion, wherein at least one chip-breaker arrangement is arranged in at least one of the lower and upper surfaces, each chip-breaker arrangement comprising two elongate chip-breaker segments, an opening being provided between the segments, and wherein the segments are asymmetrically placed in relation to the bisector.

* * * * *